Patented Feb. 15, 1944

2,341,611

UNITED STATES PATENT OFFICE 2,341,611

PROCESS FOR THE PRODUCTION OF HIGH POLYMERIC CONDSENSATION PRODUCTS

Max Hagedorn, Dessau, and Ernst Schmitz-Hillebrecht, Bitterfeld, Germany; vested in the Alien Property Custodian No Drawing. Application April 3, 1940, Serial No. 327,632. In Germany March 24, 1939

4 Claims. (Cl. 260—78)

This invention relates to the production of high polymeric condensation products.

It is an object of this invention to produce high polymeric products by condensation.

Another object is the provision of high polymeric products of various properties.

These and other objects will be apparent from the following description.

It has been found that aromatic acids being substituted at least by two, if necessary substituted amino groups, may be condensed with aliphatic carboxylic acids or aromatic substituted aliphatic amino carboxylic acids. The condensation products thus obtained have a high softening point and good film-forming properties. The moulded products obtained therefrom show also good mechanical properties. Different proportions of the components lead to high polymeric compounds of a very wide range of properties. If polyamino carboxylic acids are used in excess as the starting material, usually resinous glass-clear products are obtained. If the aliphatic amino carboxylic acid is in excess, polymers of the so called superpolyamide type are obtained. Such condensates are not pure chain-polymerisates, but show also net- and bridge-formation.

The chemical and physical character of the superpolymeric reaction products is extensively influenced by the kind of aromatic polyamino carboxylic acids used in this reaction. The use of the symmetrical 3,5-diamino benzoic acid for instance leads to very hard condensates, whereas the application of the 2,5-diamino benzoic acid results in softer high polymers.

As aliphatic amino carboxylic acids, the compounds of this constitution known to be useful in polyamide formation may be used, preferably, however, ω-amino carboxylic acids, containing 5 and more carbon atoms between the amino and the carboxyl group. Instead of the free aliphatic amino carboxylic acids there can be used the known condensable amide-forming derivatives, like anhydrides, (which is to be considered as embracing the lactams) esters, nitriles, halides and the like may be employed. Instead of the purely aliphatic amino carboxylic acids also aromatic substituted ones may be used. Care has to be taken, however, that the substitution does not occur on the primary amino group, as amino carboxylic acids with a secondary amino group react much slower.

It is also possible to use instead of the amino carboxylic acid mixtures of dicarboxylic acids and terminal diamines, which simultaneously are condensed amongst themselves into acid amides, which afterwards react with the polyamino carboxylic acids.

The aromatic polyamino carboxylic acids include the various diamino benzoic acids, diamino naphthoic acids and the corresponding triamino carboxylic acids, in which still other places of the rings or an amino group may be substituted.

Also useful in this invention are such aromatic polyamino carboxylic acids which contain more than one carboxyl group, e. g. the 4,4'-diaminodiphenyl-3,3'-dicarboxylic acid or diaminodiphenylmethane-4,4'-dicarboxylic-acid, p-aminodiphenyl-aspartic acid.

The union of the various amino carboxylic acids is accomplished in the simplest form by melting, which may be done in the presence or absence of an indifferent solvent or non-solvent for the starting components or for the reaction product. The reaction temperature lies at an average within 175–250° C. If polymerization of the reactants into high molecular reaction products occurs below that temperature range, this polymerization takes place very slowly and often without giving the maximal chain-length.

High purity of the starting materials and also the exclusion of atmospheric oxygen during the reaction is most important for the quality of the high molecular final product. The pressure in the reaction vessel is far less important. One may work at the normal atmospheric pressure, in a vacuum, or with excess pressure, according to the steam- and sublimation pressure of the reactants and the kind of reaction, polymerization, and/or condensation, whereby water is split off.

Generally it is not necessary to add special catalysts accelerating the polymerization. Most probably the polycarboxylic acid accelerates reaction. However, if the speed of the reaction is slow, it may be increased by catalysts. A large number of catalytically effective substances are available for selection according to the reaction conditions used. Catalysts of an acid nature are most effective. Examples of these catalysts are inorganic acids i. e. hydrochloric acid, aliphatic and aromatic carboxylic acids, phenols, sulfo acids, hydrohalides of amines or amino carboxylic acids, generally speaking compounds reacting under formation of organic acids. Secondary in this respect are indifferent neutral compounds like diatomaceous earth, active carbon, fuller's earth which essentially are surface active and basic compounds, preferably organic amines.

The field of application of the superpolymers is very wide. Besides their usefulness for textile purposes in the form of filaments they are well suited for the production of films (for photographic and other purposes), plates (as substitutes for glass), sheets or foils (for electric insulation, coating foils for cigarette tips, wrapping foils, adhesive foils, light filters, patterns, stencils, supports for prints or the like), sound records (either those in which the sound track is cut mechanically into the support or is impressed therein without removal of material. (The Edison or the Berliner method)), masses for the reproduction and printing arts, masses for dye-casting and moulding by pressure (production of camera parts and casings for rollfilm or filmpacks by pressing or rolling, production of spools or parts thereof for photographic rollfilms by the moulding method), as adhesive or intermediate layers for composite glass. The sheets or foils made from the materials according to this invention may be provided with a metallic coating according to a known process.

The application of the products in the form of films, filaments and the like takes place according to known processes, which include the following methods: dye-casting, casting from the melt or from solutions, drawing from the molten mass or under pressure below the softening point, warm- and cold stretching, rolling, in order to effect an orientation of the molecules in one or several directions, etc.

Example I

ε-aminocaprolactam and 3,5-diamino benzoic acid, both purified by repeated crystallization, are well mixed and heated 20 hours at 200° C. in a glass tube in a pure $CO_2$ atmosphere under quicksilver cover allowing an excess pressure of about 50 mm. Hg.

The following variations may be mentioned:

(a) 3 parts ε-aminocaprolactam+17 parts 3,5-diamino benzoic acid, a resin, stringy in liquid state, red-brown, clear transparent.
(b) 9 parts ε-aminocaprolactam+11 parts 3,5-diamino benzoic acid, a resin, stringy in liquid state, red-brown, clear transparent.
(c) 13 parts ε-aminocaprolactam+7 parts 3,5-diamino benzoic acid, a resin, stringy in liquid state, red-brown, clear transparent.
(d) 15 parts ε-aminocaprolactam+5 parts 3,5-diamino benzoic acid, a resin, stringy in liquid state, of honey-like color, transparent til opaque.
(e) 19 parts ε-aminocaprolactam+1 part 3,5-diamino benzoic acid, a resin, stringy in liquid state, opaque.

The hardness and the melting point increase from a-e, the latter being capable of being moulded at temperatures above 300° C. only. a is capable of swelling in formic acid, b to d are dissolved therein and yield films from this solution, which are brittle except e. a is not soluble in 25 per cent hydrochloric acid, b to e are soluble therein, partly also in acids of lower concentration.

Example II

ε-aminocaprolactam is condensed with 1,2-phenlyene-diamine-4-carboxylic acid according to Example I as dihydrochloride at 190° C. for 24 hours.

The following variations may be mentioned:

(a) 8 parts ε-aminocaprolactam+12 parts 1,2-phenylenediamine-4-carboxylic acid, a resin, slightly sticky, bluish, clear transparent.
(b) 12 parts ε-aminocaprolactam+8 parts 1,2-phenylenediamine-4-carboxylic acid, a resin, slightly sticky, bluish, clear transparent.
(c) 15 parts ε-aminocaprolactam+5 parts 1,2-phenylenediamine-4-carboxylic acid, a violet resin.
(d) 19 parts ε-aminocaprolactam+1 part 1,2-phenylenediamine-4-carboxylic acid.

a and b dissolved in formic acid yield a soft, slightly sticky film, the film from c is somewhat harder, the film from d is still harder.

Example III

ε-aminocaprolactam and 2,5-diaminobenzoic-acid-dihydrochloride are mixed and heated as in Examples I and II at 190–210° C. for 24 hours.

The following variations may be mentioned:

(a) 8 parts ε-aminocaprolactom+12 parts 2,5-diaminobenzoic-acid - dihydrochloride, a black-green, sticky condensate.
(b) 12 parts ε-aminocaprolactam+8 parts 2,5-diaminobenzoic-acid - dihydrochloride, a green, transparent resin, soluble in methanol.
(c) 15 parts ε-aminocaprolactam+5 parts 2,5-diaminobenzoic-acid - dihydrochloride, a green, transparent, sticky resin, soluble in methol.
(d) 19 parts ε-aminocaprolactam+1 part 2,5-diaminobenzoicacidhydrochloride, opaque, milky brownish resin of great hardness. It is insoluble in methanol, but dissolves readily in formic acid, m-cresol and concentrated sulfuric acid.

Example IV 4.5 grams ε-amino caproic acid, several times recrystallized are mixed with 0.5 gram 2,5-diaminobenzoic-acid-hydrochloride and heated at 200–205° C. for 24 hours in a glass tube in pure $CO_2$ atmosphere under quicksilver cover allowing an excess pressure of about 50 mm. Hg. A melt is obtained which is stringy in the liquid state, soluble in formic acid and which can be worked up from this solution into a mat brittle film.

If the reactants are mixed in the proportion 3.5:1.5 after heating for 48 hours, a dark colored melt is obtained soluble not only in formic acid, but also in hot water. The film from formic acid is transparent and brittle. If the reactants are mixed in the proportion 4:1 and a catalyst, e. g. ε-amino-caproic-acid-hydrochloride is added and the reaction mixture heated under the above mentioned conditions for 24 hours at 200–205° C., a dark-lustrous melt is obtained soluble in methanol and formic acid. After casting of this solution a sticky film is obtained.

Example V 3 parts hexamethylenediammonium adipate and 2 parts pure 3,5-diamino benzoic acid are caused to react at 200° C. for 24 hours under conditions as mentioned in the preceding examples. A transparent, red colored resin is obtained, not soluble in any solvent.

If the reactants are applied in the proportion 3:2, a transparent resin is obtained less red in color and capable of swelling in formic acid.

What we claim is:

1. A process for the manufacture of superpolymers which comprises melting an aromatic polyamino carboxylic acid containing at least two primary amino groups with an aliphatic amino carboxylic acid substance selected from the class consisting of aliphatic omega primary monoaminomonocarboxylic acids and amide-forming derivatives of these acids.

2. The process set forth in claim 1 in which said aliphatic amino carboxylic acid compound is an aliphatic omega primary monoaminomonocarboxylic acid.

3. A highly polymerized product obtained by the process set forth in claim 1.

4. The process set forth in claim 1 in which said aliphatic omega primary monoaminomonocarboxylic acid compound is one containing at least 5 carbon atoms between the amino and the carbon atom of the carboxylic group.

MAX HAGEDORN.
ERNEST SCHMITZ-HILLBRECHT.